United States Patent
Sedin et al.

(10) Patent No.: US 11,943,706 B2
(45) Date of Patent: Mar. 26, 2024

(54) SELECTING A NON-TERRESTRIAL NETWORK BASED PUBLIC LAND MOBILE NETWORK

(71) Applicant: Telefonaktiebolaget LM Ericsson (publ), Stockholm (SE)

(72) Inventors: Jonas Sedin, Sollentuna (SE); Olof Liberg, Enskede (SE); Helka-Liina Määttanen, Helsinki (FI)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 374 days.

(21) Appl. No.: 17/435,062

(22) PCT Filed: Apr. 5, 2020

(86) PCT No.: PCT/IB2020/053246
§ 371 (c)(1),
(2) Date: Aug. 31, 2021

(87) PCT Pub. No.: WO2020/202121
PCT Pub. Date: Oct. 8, 2020

(65) Prior Publication Data
US 2022/0256445 A1 Aug. 11, 2022

Related U.S. Application Data

(60) Provisional application No. 62/829,973, filed on Apr. 5, 2019.

(51) Int. Cl.
*H04W 48/18* (2009.01)
*H04W 64/00* (2009.01)
(Continued)

(52) U.S. Cl.
CPC ......... *H04W 48/18* (2013.01); *H04W 64/006* (2013.01); *H04W 84/042* (2013.01); *H04W 84/06* (2013.01)

(58) Field of Classification Search
CPC . H04W 48/18; H04W 64/006; H04W 84/042; H04W 84/06; H04W 48/16; H04B 7/18539; H04B 7/18513
See application file for complete search history.

(56) References Cited

U.S. PATENT DOCUMENTS

2017/0331670 A1* 11/2017 Parkvall .............. H04L 41/0816

FOREIGN PATENT DOCUMENTS

| WO | WO 2016/205765 A1 | 12/2016 |
| WO | WO 2018/022377 A1 | 2/2018 |

OTHER PUBLICATIONS

International Search Report and Written Opinion of the International Searching Authority, PCT/IB2020/053246, dated Jul. 16, 2020, 17 pages.
(Continued)

*Primary Examiner* — Kabir A Timory
(74) *Attorney, Agent, or Firm* — Christopher & Weisberg, P.A.

(57) ABSTRACT

A wireless device, UE, in a communication network receives satellite positioning information and a list of a plurality of different types of measurements to perform to find a public land mobile network, PLMN, to select. The UE performs the plurality of different types of measurements on a frequency associated with a found PLMN to generate a plurality of measurement results. The UE determines, based on the plurality of measurements results, whether a high-quality indication should be provided to a non-access stratum, NAS. Responsive to determining that the high-quality indication should be provided, the UE provides the high quality indication and an identification of the found PLMN to the NAS.

20 Claims, 11 Drawing Sheets

(51) Int. Cl.
  *H04W 84/04* (2009.01)
  *H04W 84/06* (2009.01)

(56) References Cited

OTHER PUBLICATIONS

3rd Generation Partnership Project; Technical Specification Group Radio Access Network; NR; User Equipment (UE) Procedures in Idle Mode and RRC Inactive State (Release 15), 3GPP TS 38.304 V. 15.2.0 (Dec. 2018) (XP051576850) 28 pages.
3rd Generation Partnership Project; Technical Specification Group Radio Access Network; Study on New Radio (NR) to Support Non Terrestrial Networks (Release 15), 3GPP TR 38.811 V. 15.0.0 (Jun. 2018) 118 pages.
Study on Solutions Evaluation for NR to Support Non Terrestrial Network, 3GPP TSG RAN Meeting #80, RP-181370, La Jolla, USA, Jun. 11-14, 2018, Thales, SID New, Agenda Item 9.1.17, 5 pages.

\* cited by examiner

| Elevation angle | Path | D (km) | Time (ms) |
|---|---|---|---|
| UE:10° | satellite - UE | 40586 | 135.286 |
| GW: 5° | satellite - gateway | 41126.6 | 137.088 |
| 90° | satellite - UE | 35786 | 119.286 |
| Bent Pipe satellite | | | |
| One way delay | Gateway-satellite_UE | 81712.6 | 272.375 |
| Round trip Time | Twice | 163425.3 | 544.751 |
| Regenerative Satellite | | | |
| One way delay | Satellite -UE | 40586 | 135.286 |
| Round Trip Time | Satellite-UE-Satellite | 81172 | 270.572 |

Figure 15

| Elevation angle | Path | LEO at 600 km | | LEO at 1500 km | | MEO at 10000 km | |
|---|---|---|---|---|---|---|---|
| | | Distance D (km) | Delay (ms) | Distance D (km) | Delay (ms) | Distance D (km) | Delay (ms) |
| UE: 10° | satellite - UE | 1932.24 | 6.440 | 3647.5 | 12.158 | 14018.16 | 46.727 |
| GW: 5° | satellite - gateway | 2329.01 | 7.763 | 4101.6 | 13.672 | 14539.4 | 48.464 |
| 90° | satellite - UE | 600 | 2 | 1500 | 5 | 10000 | 33.333 |
| Bent pipe satellite | | | | | | | |
| One way delay | Gateway-satellite-UE | 4261.2 | 14.204 | 7749.2 | 25.83 | 28557.6 | 95.192 |
| Round Trip Delay | Twice | 8522.5 | 28.408 | 15498.4 | 51.661 | 57115.2 | 190.38 |
| Regenerative satellite | | | | | | | |
| One way delay | Satellite -UE | 1932.24 | 6.44 | 3647.5 | 12.16 | 14018.16 | 46.73 |
| Round Trip Delay | Satellite-UE-Satellite | 3864.48 | 12.88 | 7295 | 24.32 | 28036.32 | 93.45 |

Figure 16

SELECTING A NON-TERRESTRIAL NETWORK BASED PUBLIC LAND MOBILE NETWORK

CROSS REFERENCE TO RELATED APPLICATIONS

This application is a 35 U.S.C. § 371 national stage application of PCT International Application No. PCT/IB2020/053246 filed on Apr. 5, 2020, which in turn claims domestic priority to U.S. Provisional Application No. 62/829,973 titled "METHODS FOR NTN PLMN SELECTION," filed Apr. 5, 2019, the disclosure of which is hereby incorporated in its entirety by reference.

TECHNICAL FIELD

The present disclosure relates generally to communications, and more particularly to communication methods and related devices and nodes supporting wireless communications.

BACKGROUND

There is an ongoing resurgence of satellite communications. Several plans for satellite networks have been announced in the past few years. The target services for these satellite networks vary, from backhaul and fixed wireless, to transportation, to outdoor mobile, to IoT. Satellite networks could complement mobile networks on the ground by providing connectivity to underserved areas and multicast/broadcast services.

To benefit from the strong mobile ecosystem and economy of scale, adapting the terrestrial wireless access technologies including LTE and new radio access technology (NR) for satellite networks is drawing significant interest. For example, the third-generation partnership project (3GPP) completed an initial study in Release 15 on adapting NR to support non-terrestrial networks (mainly satellite networks). This initial study focused on the channel model for the non-terrestrial networks, defining deployment scenarios, and identifying the key potential impacts. 3GPP is conducting a follow-up study item in Release 16 on solutions evaluation for NR to support non-terrestrial networks.

A satellite radio access network can include: a gateway that connects satellite network to core network; a satellite (e.g., a space-borne platform); a terminal (e.g., a wireless device and/or user equipment (UE); a feeder link (e.g., a link between a gateway and a satellite); and a service link (e.g., a link between a satellite and a terminal).

The link from gateway to terminal is often called forward link, and the link from terminal to gateway is often called return link. Depending on the functionality of the satellite in the system, two transponder options may be considered: a bent pipe transponder and/or a regenerative transponder. When using a Bent pipe transponder, a satellite forwards the received signal back to the earth with only amplification and a shift from uplink frequency to downlink frequency. When using a regenerative transponder, a satellite includes on-board processing to demodulate and decode the received signal and regenerate the signal before sending it back to the earth.

Depending on the orbit altitude, a satellite may be categorized as a low earth orbit (LEO) satellite, a medium earth orbit (MEO) satellite, or a geosynchronous earth orbit (GEO) satellite. A LEO satellite is located at a height ranging from 500-1,500 km, with orbital periods ranging from 10-40 minutes. A MEO satellite is located at a height ranging from 5,000-12,000 km, with orbital periods ranging from 2-8 hours. A GEO satellite is located at a height of 35,786 km, with an orbital period of 24 hours.

A satellite may generate several beams over a given area. The footprint of a beam is usually in an elliptic shape, which has been called a cell. The footprint of a beam is also often referred to as a spotbeam. The footprint of a spotbeam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

FIG. 1 shows an example architecture of a satellite network with bent pipe transponders.

Two of the main physical phenomena that affect satellite communications system design are the long propagation delay and Doppler effects. The Doppler effects are especially pronounced for LEO satellites.

Propagation Delays.

Propagation delay can be a main physical phenomenon in a satellite communication system that makes the design different from that of a terrestrial mobile system. For a bent pipe satellite network such as the satellite network illustrated in FIG. 1, the one-way delays, round-trip delays, and differential delays are relevant. A one-way delay can be a delay from the base station (BS) to the UE via the satellite, or the other way around. A round-trip delay can be a delay from the BS to the UE via the satellite and from the UE back to the BS via the satellite. A differential delay can be the delay difference of two selected points in the same spotbeam.

There may be additional delay between the ground BS antenna and BS, which may or may not be collocated. This delay depends on deployment. If the delay cannot be ignored, it should be taken into account in the communications system design.

The propagation delay depends on the length of the signal path, which further depends on the elevation angles of the satellite seen by the BS and UE on the ground. The minimum elevation angle is typically more than 10° for UE and more than 5° for BS on the ground.

The round-trip time (RTT) delay is much larger in satellite systems as illustrated in the tables of FIGS. 15-16. For example, the RTT is about 545 ms for a GEO satellite system such as the satellite network illustrated in FIG. 1. In contrast, the round-trip time may be no more than 1 ms for terrestrial cellular network. FIG. 15 is a table illustrating an example of propagation delays for GEO satellites. FIG. 16 is a table illustrating an example of propagation delays for non-GSO (NGSO) satellites. Within a spot beam covering one cell, the delay may be divided into a common delay component and a differential delay component. The common delay is the same for all UEs in the cell and may be determined with respect to a reference point in the spot beam. In contrast, the differential delay may be different for different UEs as the differential delay depends on the propagation delay between the reference point and the point at which a given UE is positioned within the spot beam.

The differential delay is mainly due to the different path lengths of the access links, since the feeder link is normally the same for terminals in the same spotbeam. Further, the differential delay is mainly determined by the size of the spotbeam. It may range from sub-millisecond (for spotbeam on the order of tens of kilometres) to tens of millisecond (for spotbeam on the order of thousands of kilometres).

In RAN #80, a new study item (SI) "Solutions for NR to support Non-Terrestrial Network" was agreed upon. The SI is a continuation of a preceding SI "NR to support Non-Terrestrial Networks" (RP-171450), where the objective was to study the channel model for the non-terrestrial networks, to define deployment scenarios, parameters and identify the key potential impacts on NR.

Public land mobile network (PLMN) selection in NR is defined by TS 38.304 and TS 23.122. TS 38.304 defines the below access stratum (AS) functionality:

"The UE shall scan all RF channels in the NR bands according to its capabilities to find available PLMNs. On each carrier, the UE shall search for the strongest cell and read its system information, in order to find out which PLMN(s) the cell belongs to. If the UE can read one or several PLMN identities in the strongest cell, each found PLMN (see the PLMN reading in TS 38.331 [3]) shall be reported to the NAS as a high quality PLMN (but without the RSRP value), provided that the following high-quality criterion is fulfilled:

1. For an NR cell, the measured RSRP value shall be greater than or equal to −110 dBm.

Found PLMNs that do not satisfy the high-quality criterion but for which the UE has been able to read the PLMN identities are reported to the NAS together with their corresponding RSRP values. The quality measure reported by the UE to NAS shall be the same for each PLMN found in one cell.

The search for PLMNs may be stopped on request from the NAS. The UE may optimise PLMN search by using stored information e.g. frequencies and optionally also information on cell parameters from previously received measurement control information elements.

Once the UE has selected a PLMN, the cell selection procedure shall be performed in order to select a suitable cell of that PLMN to camp on."

TS 23.122 define how the non-access stratum (NAS) selects PLMN based on the information obtained from the AS. This selection may be based on the type of PLMN, e.g., Home PLMNs (HPLMNs), based on the access technology supported by the PLMN, e.g. LTE, based on the signal quality and strength measured on a PLMN. and based on the UEs and PLMNs capabilities.

The below text is a sample from TS 23.122 illustrating one of the current PLMN selection procedures:

"4.4.3.1.1 Automatic Network Selection Mode Procedure

The MS selects and attempts registration on other PLMN/access technology combinations, if available and allowable, in the following order:

i) either the (if the EHPLMN list is not present or is empty) or the highest priority EHPLMN that is available (if the EHPLMN list is present);

ii) each PLMN/access technology combination in the "User Controlled PLMN Selector with Access Technology" data file in the SIM (in priority order);

iii) each PLMN/access technology combination in the "Operator Controlled PLMN Selector with Access Technology" data file in the SIM (in priority order);

iv) other PLMN/access technology combinations with received high quality signal in random order;

v) other PLMN/access technology combinations in order of decreasing signal quality.

When following the above procedure the following requirements apply:

a) An MS with voice capability shall ignore PLMNs for which the MS has identified at least one GSM COMPACT.

b) . . . "

SUMMARY

According to some embodiments of inventive concepts according to the present disclosure, methods are provided to provide mechanisms for a wireless device to select NTN PLMNs and terrestrial PLMNs. The wireless device receives satellite positioning information. The wireless device further receives a list of a plurality of different types of measurements to perform to find a public land mobile network (PLMN) to select. The wireless device may perform the plurality of different types of measurements on a frequency associated with a found PLMN to generate a plurality of measurement results. The wireless device may determine based on the plurality of measurement results whether a high-quality indication should be provided to a non-access stratum (NAS). Responsive to determining that the high-quality indication should be provided, the wireless device provides the high quality indication and an identification of the found PLMN to the NAS.

A potential advantage of this method is that a wireless device may select a suitable PLMN based on relevant NTN aspects. By performing the additional measurements (i.e., the plurality of different types of measurements), a wireless device that operates according to this method may avoid selecting a PLMN that has aspects that may impair the link quality of service (QoS) that the wireless device may have otherwise selected without performing the additional measurements.

According to some other embodiments, a method is provided to operate a wireless device. The wireless device receives satellite positioning information and a list of a plurality of different types of measurements to perform to find a public land mobile network (PLMN) to select, the plurality of different types of measurements including a reference signal received power (RSRP) measurement. The wireless device may perform the plurality of measurements on a frequency associated with a found PLMN to generate a plurality of measurement results including a RSRP. The wireless device may determine whether the RSRP is greater than a RSRP threshold. Responsive to determining the RSRP is greater than the threshold, the wireless device may determine based on the plurality of measurement results whether every additional measurement result in the plurality of measurement results is above or below the corresponding threshold as specified. Responsive to every of the additional specified measurement results being above or below the thresholds as specified, the wireless device forwards the identification of the found PLMN and a high-quality indication to the NAS. Responsive to any of the additional specified measurement results not being above or below the thresholds as specified, the wireless device may forward the identification of the found PLMN with a high quality RSRP indication and the additional measurement results to the NAS.

According to some other embodiments, a method is provided to operate a wireless device. The wireless device may receive for each of a plurality of public land mobile networks (PLMNs), an identification of the PLMN and one of a plurality of measurement results for the PLMN or a high-quality indication for the PLMN, the PLMN being one of a terrestrial PLMN or a non-terrestrial network (NTN) PLMN. The wireless device may prioritize the plurality of PLMNs based on the high-quality indication and the plurality of measurement results. The wireless device may select a PLMN to camp on from the plurality of PLMNs based on the prioritization. The wireless device may perform an action to camp on the selected PLMN.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 15 is a table illustrating examples of propagation delays for GEO satellites; and FIG. 16 is a table illustrating examples of propagation delays for NGSO satellites.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
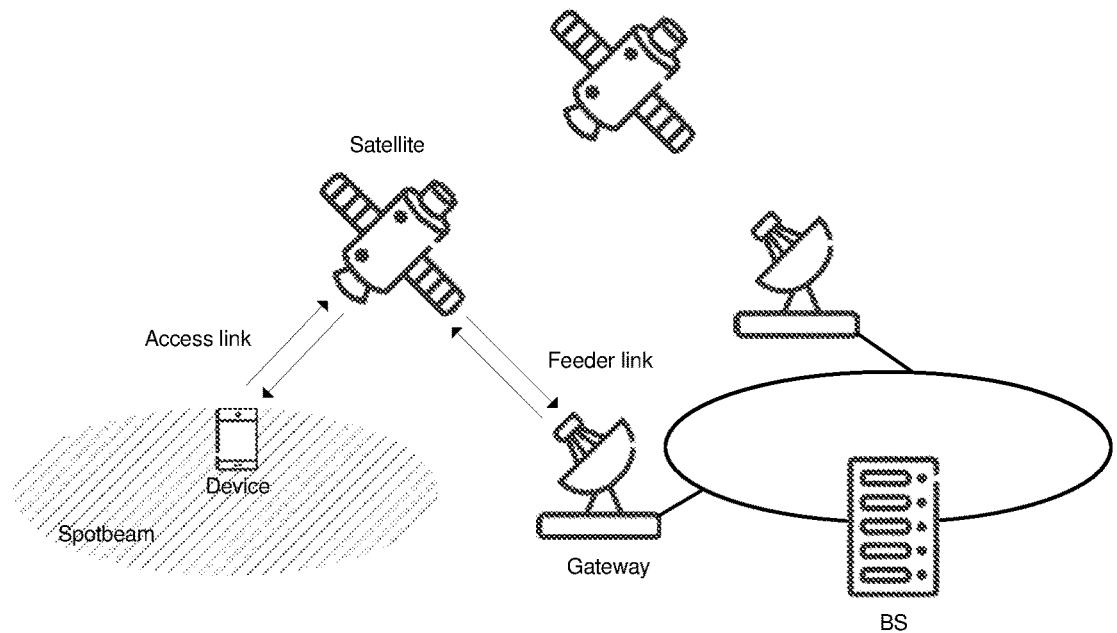
FIG. 1 is an illustration of a satellite network with bent pipe transponders according to some embodiments.
Figure 2:
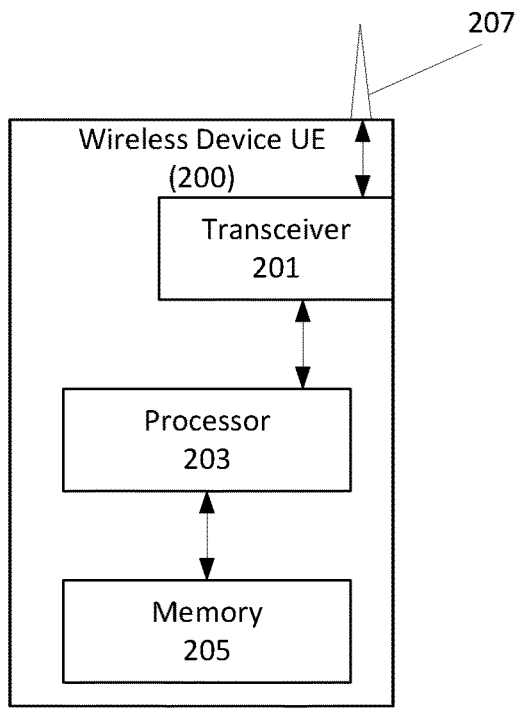
FIG. 2 is an illustration of an angle of elevation according to some embodiments.

FIG. 2 is a block diagram illustrating elements of a wireless device 200 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. (Wireless device 200 may be provided, for example, as discussed below with respect to wireless device 4110 of FIG. 17.) As shown, wireless device UE may include an antenna 207 (e.g., corresponding to antenna 4111 of FIG. 17), and transceiver circuitry 201 (also referred to as a transceiver, e.g., corresponding to interface 4114 of FIG. 17) including a transmitter and a receiver configured to provide uplink and downlink radio communications with a base station(s) (e.g., corresponding to network node 4160 of FIG. 17) of a radio access network. Wireless device UE may also include processing circuitry 203 (also referred to as a processor, e.g., corresponding to processing circuitry 4120 of FIG. 17) coupled to the transceiver circuitry, and memory circuitry 205 (also referred to as memory, e.g., corresponding to device readable medium 4130 of FIG. 17) coupled to the processing circuitry. The memory circuitry 205 may include computer readable program code that when executed by the processing circuitry 203 causes the processing circuitry to perform operations according to embodiments disclosed herein. According to other embodiments, processing circuitry 203 may be defined to include memory so that separate memory circuitry is not required. Wireless device UE may also include an interface (such as a user interface) coupled with processing circuitry 203, and/or wireless device UE may be incorporated in a vehicle.

As discussed herein, operations of wireless device UE may be performed by processing circuitry 203 and/or transceiver circuitry 201. For example, processing circuitry 203 may control transceiver circuitry 201 to transmit communications through transceiver circuitry 201 over a radio interface to a radio access network node (also referred to as a base station) and/or to receive communications through transceiver circuitry 201 from a RAN node over a radio interface. Moreover, modules may be stored in memory circuitry 205, and these modules may provide instructions so that when instructions of a module are executed by processing circuitry 203, processing circuitry 203 performs respective operations (e.g., operations discussed below with respect to Example Embodiments relating to wireless devices).

Figure 3:
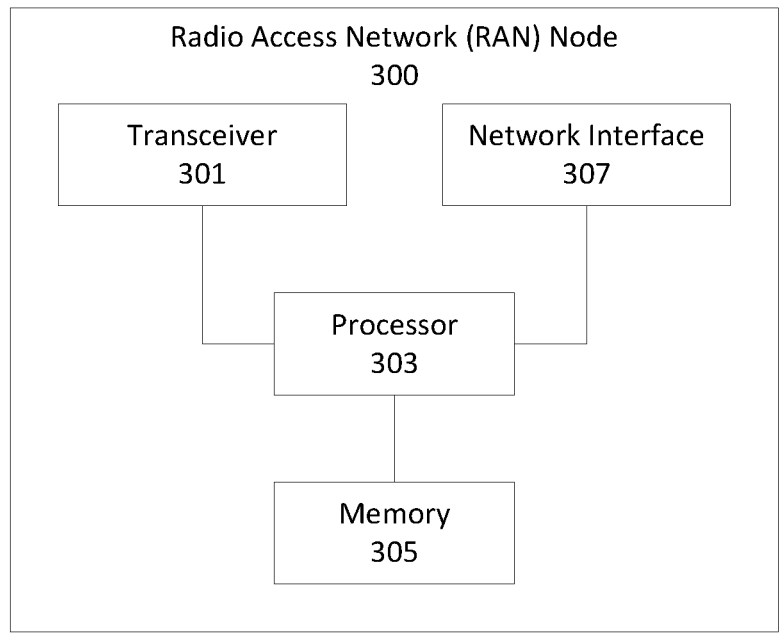
FIG. 3 is a block diagram illustrating a mobile terminal UE according to some embodiments of inventive concepts.

FIG. 3 is a block diagram illustrating elements of a radio access network RAN node 300 (also referred to as a network node, base station, eNodeB/eNB, gNodeB/gNB, etc.) of a Radio Access Network (RAN) configured to provide cellular communication according to embodiments of inventive concepts. (RAN node 300 may be provided, for example, as discussed below with respect to network node 4160 of FIG. 17.) As shown, the RAN node may include transceiver circuitry 301 (also referred to as a transceiver, e.g., corresponding to portions of interface 4190 of FIG. 17) including a transmitter and a receiver configured to provide uplink and downlink radio communications with mobile terminals. The RAN node may include network interface circuitry 307 (also referred to as a network interface, e.g., corresponding to portions of interface 4190 of FIG. 17) configured to provide communications with other nodes (e.g., with other base stations) of the RAN and/or core network CN. The network node may also include a processing circuitry 303 (also referred to as a processor, e.g., corresponding to processing circuitry 4170) coupled to the transceiver circuitry, and a memory circuitry 305 (also referred to as memory, e.g., corresponding to device readable medium 4180 of FIG. 17) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that a separate memory circuitry is not required.

As discussed herein, operations of the RAN node may be performed by processing circuitry 303, network interface 307, and/or transceiver 301. For example, processing circuitry 303 may control transceiver 301 to transmit downlink communications through transceiver 301 over a radio interface to one or more mobile terminals UEs and/or to receive uplink communications through transceiver 301 from one or more mobile terminals UEs over a radio interface. Similarly, processing circuitry 303 may control network interface 307 to transmit communications through network interface 307 to one or more other network nodes and/or to receive communications through network interface from one or more other network nodes. Moreover, modules may be stored in memory 305, and these modules may provide instructions so that when instructions of a module are executed by processing circuitry 303, processing circuitry 303 performs respective operations such as providing to the wireless device 200 (also referred to as UE in the description below) the thresholds to use for measurements as described below.

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 4:
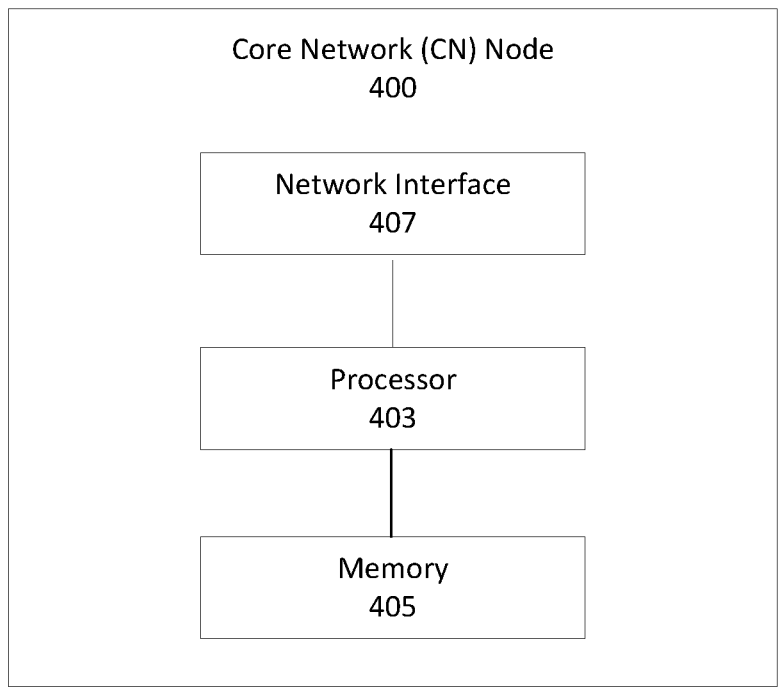
FIG. 4 is a block diagram illustrating a radio access network RAN node (e.g., a base station eNB/gNB) according to some embodiments of inventive concepts.

FIG. 4 is a block diagram illustrating elements of a core network CN node (e.g., an SMF node, an AMF node, etc.) of a communication network configured to provide cellular communication according to embodiments of inventive concepts. As shown, the CN node may include network interface circuitry 407 (also referred to as a network interface) configured to provide communications with other nodes of the core network and/or the radio access network RAN. The CN node may also include a processing circuitry 403 (also referred to as a processor) coupled to the network interface circuitry, and memory circuitry 405 (also referred to as memory) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the CN node may be performed by processing circuitry 403 and/or network interface circuitry 407. For example, processing circuitry 403 may control network interface circuitry 407 to transmit communications through network interface circuitry 407 to one or more other network nodes and/or to receive communications through network interface circuitry from one or more other network nodes. Moreover, modules may be stored in memory 405, and these modules may provide instructions so that when instructions of a module are executed by processing circuitry 403, processing circuitry 403 performs respective operations such as communicating with the UE over the NAS layer.

PLMN Selection

In current specifications, the access stratum (AS) layer in the UE may scan all radio frequency (RF) bands to find available public land mobile networks (PLMNs). The scanning may include finding the strongest cell on each carrier and reading the system information. The AS layer in the UE shall report the found PLMNs and their associated measured RSRP (reference signal received power) value to the NAS layer, which selects a PLMN to camp on according to 3GPP TS 23.122.

If the UE finds that the measured RSRP value is larger than a specific value, then the UE shall report these PLMNs as "high quality signal" to the NAS layer that makes the selection among the available PLMNs.

Figure 5:
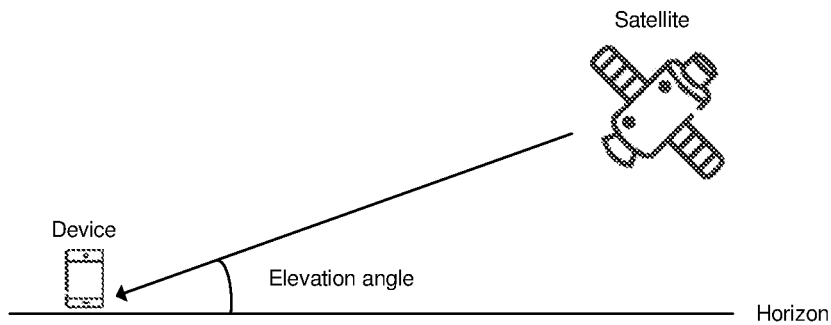
FIG. 5 is a block diagram illustrating a core network node (e.g., an AMF node, an SMF node, etc.) according to some embodiments of inventive concepts.

One problem identified is that the current PLMN selection criterion for determining the PLMNs may not be suitable for non-terrestrial network (NTN) cells due the different propagation in an NTN compared to a terrestrial network. One example of why this may not be suitable is that a satellite may not be suitable to select if the satellite is too close to the horizon, i.e. if the angle of elevation between the UE and the satellite (see FIG. 5) is too low. A small elevation in associated with large doppler frequency offsets and large round-trip times (RTTs) which both are aspects that impairs the link quality of service (QoS).

A second problem that may occur is that the current NAS PLMN selection according to 3GPP TS 23.122 does not take any NTN specifics into consideration. Due to the significant delays, path loss and Doppler frequency offsets associated with an NTN, the NTN may not be able to offer the same QoS as a terrestrial NW. These delays, path loss, and offsets are currently not accounted for in the PLMN selection.

This second problem may cause the UE to connect to a PLMN where the propagation delay is much larger than what the radio technology operating the PLMN supports, making establishing connection to a cell in the PLMN difficult or even impossible, which further on might cause large amount of interference.

A set of basic mechanisms for preparing PLMN selection for NTN is described below. The mechanisms may ensure that a UE selects a suitable PLMN based on relevant NTN aspects.

In one embodiment the existing PLMN selection, i.e. to determine the "high quality signal" is enhanced, in addition to RSRP, based on one or more of the following measurements performed by a UE: RSRQ (reference signal received quality), or another signal quality metric such as SINR (signal-to-interference-plus-noise ratio); RTT (round trip time); differential delay, i.e. the delay between the measured RTT and a broadcasted cell or PLMN specific RTT; UE geographical position; satellite elevation angle; satellite orbital height; and/or satellite ephemeris data In some embodiments a UE may be capable of only performing one of the above measurements. In additional or alternative embodiments, A UE may be capable of performing a few of the above listed measurements. In additional or alternative embodiments, a UE may be capable of performing all of the above measurements.

The above measured metrics may be compared to corresponding thresholds that may be signalled by the network via a network node or be fixed in the 3GPP specifications. The signalling may be done by radio resource control (RRC) or NAS. The UE may signal the measured values to the NAS together with a high signal quality indicator when applicable, as exemplified in the embodiments illustrated in FIGS. 6-8.

Operations of the wireless device 200 (implemented using the structure of the block diagram of FIG. 2) will now be discussed with reference to the flow chart of FIG. 6 according to some embodiments of inventive concepts. For example, modules may be stored in memory 205 of FIG. 2, and these modules may provide instructions so that when the instructions of a module are executed by respective wireless device processing circuitry 203, processing circuitry 203 performs respective operations of the flow chart.

Figure 6:
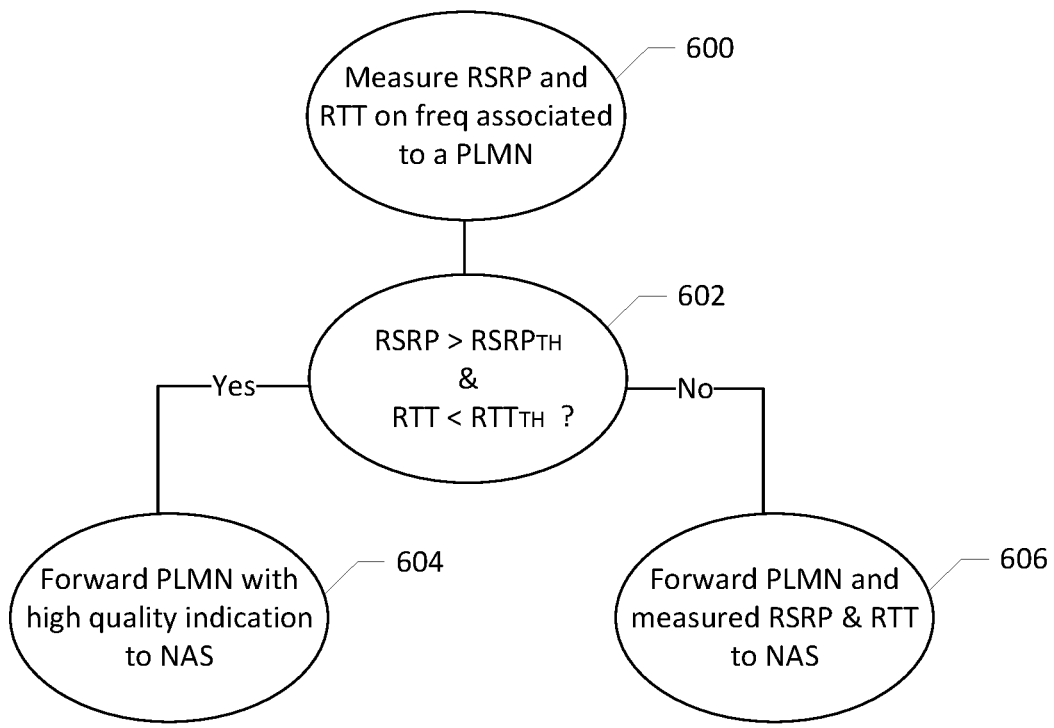
FIGS. 6-11 are flow charts illustrating operations of providing a high-quality indication according to some embodiments of inventive concepts.

Turning to FIG. 6, the additional measured value specified shall be RTT to describe this embodiment. Other measurements may be used, such as one of the measurements described above. In operation 600, the processing circuitry 203 may measure the RSRP and RTT on the frequency associated to a PLMN. In operation 602, the processing circuitry 203 may determine whether the RSRP is greater than an RSRP threshold and whether the RTT is less than an RTT threshold. Responsive to the RSRP being greater than the RSRP threshold and the RTT being less than the RTT threshold, the processing circuitry 203 may forward the identification of the PLMN and a high-quality indication to the NAS in operation 604. Responsive to either the RSRP being less than the RSRP threshold or the RTT being greater than the RTT threshold, the processing circuitry 203 may forward the identification of the PLMN and the measured RSRP and RTT values to the NAS in operation 606.

Figure 7:
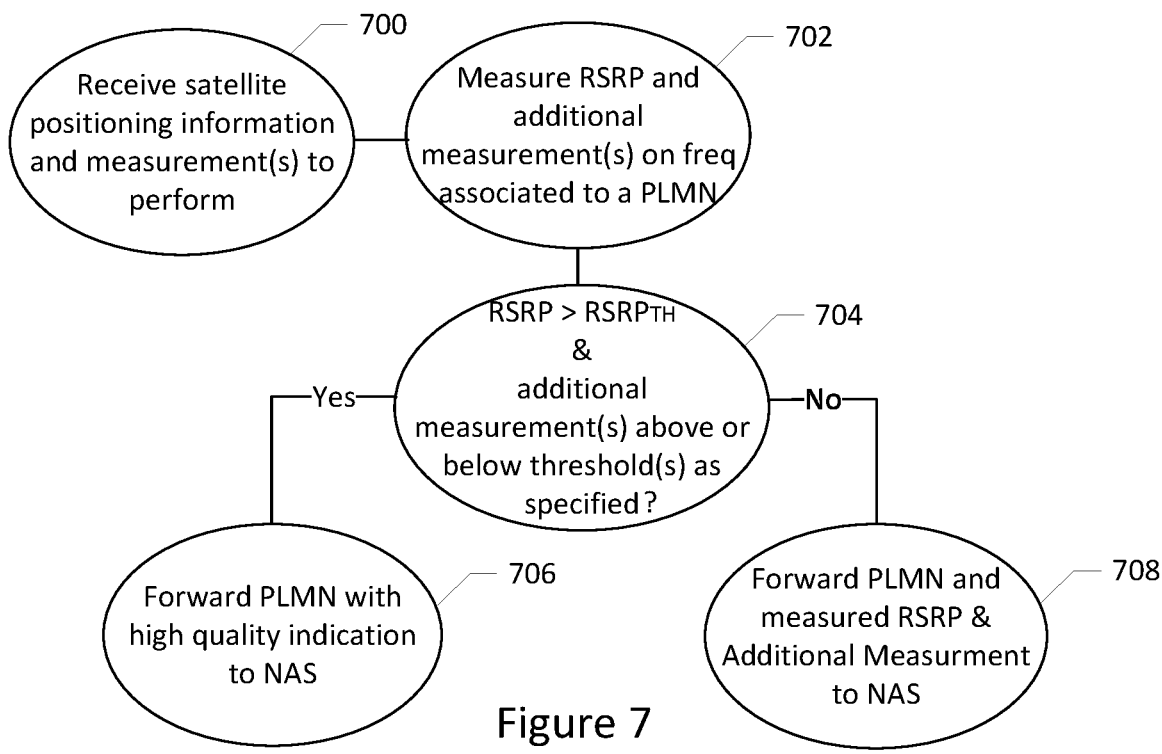

FIG. 7 illustrates an embodiment where multiple additional measurements may be taken. In operation 700, the processing circuitry 203 may receive satellite positioning information and/or a list of a plurality of measurements to perform to find a PLMN to select. The plurality of measurements may include a plurality of different types of measurements. In some embodiments, one of the plurality of different types of measurements includes an RSRP measurement. In additional or alternative embodiments, the list of the plurality of different types of measurements may include at least one of a reference signal received quality, RSRQ, measurement a signal-to-interference-plus-noise ratio, SINR, measurement a round trip time, RTT, measurement and a differential delay measurement. In some examples, a differential delay is a difference in propagation delay of UEs in the cell. In additional or alternative examples, a differential delay is the difference in distance between the UE and a satellite. The satellite positioning information may include at least one of a UE geographical position, a satellite elevation angle, a satellite orbital height, and satellite ephemeris data. The list may also provide the threshold to use in which to compare the measurement results for each of the plurality of different types of measurements. For example, the threshold for a measurement result may indicate whether the measurement result should be above or below the specified threshold value. The one or more measurements may depend on the capability of the UE as described above. When a specified measurement is satellite specific, a default comparison result may be specified for terrestrial based PLMNs. For example, if satellite elevation angle is specified and the threshold specified is being greater than or equal to a specified angle, the default comparison result for terrestrial based PLMNs is an indication of a "yes." Alternatively, the comparison result may indicate that it is not applicable.

In operation 702, the processing circuitry 203 may perform the plurality of measurements on a frequency associated with a found PLMN to generate a plurality of measurement results. For example, a RSRP may be measured and the additional specified measurement results in the plurality of measurement results may be generated (i.e., measured) from the frequency associated to the found PLMN. In operation 704, the processing circuitry 203 may determine based on the plurality of measurement results whether a high-quality indication should be provided to the NAS. For example, if the RSRP is greater than an RSRP threshold and if the additional measurement results are above or below the thresholds as specified, the indication should be provided. An example of the additional plurality of measurement results may be RTT and RSRQ, and the thresholds may be RTT<$RTT_{TH}$ and RSRQ≥$RSRQ_{TH}$.

Figure 8:
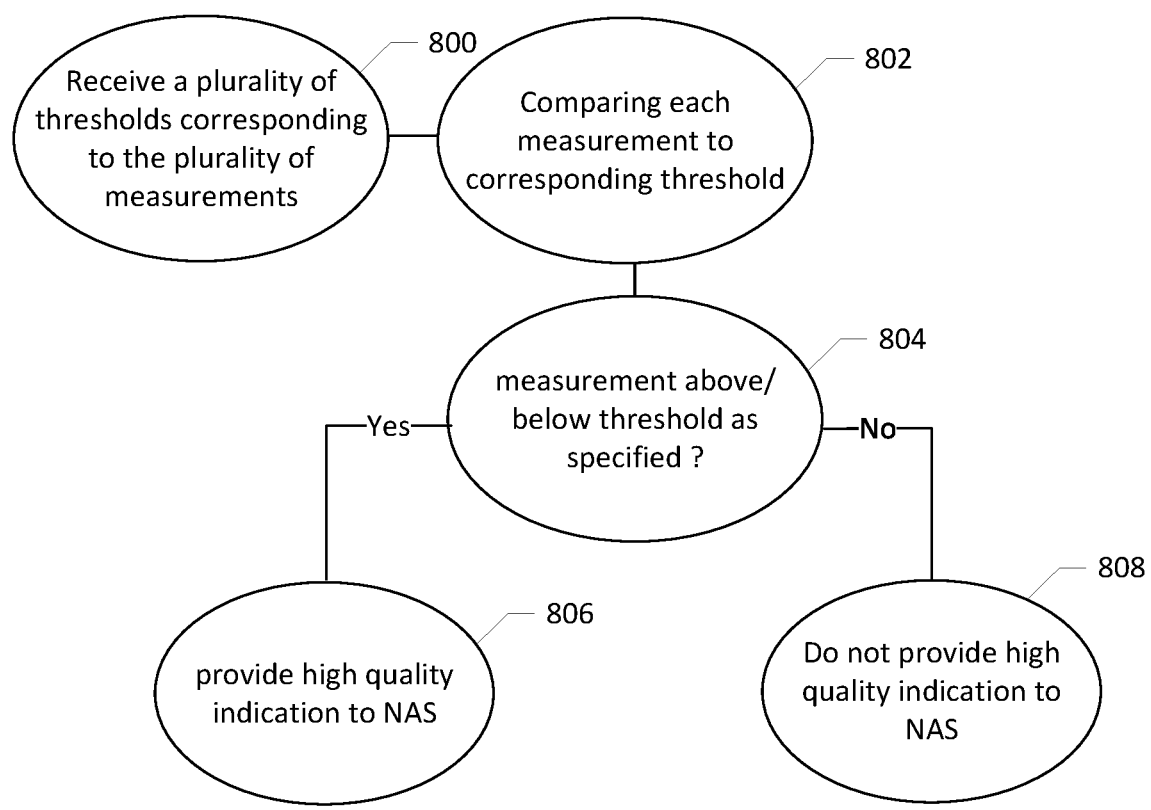

Turning to FIG. 8, in one embodiment, determining (704) based on the plurality of measurement results whether the high-quality indication should be provided to the NAS includes receiving, in operation 800, a plurality of thresholds, each of the plurality of thresholds corresponding to one of the plurality of measurement results and indicating whether the measurement result should be above or below a threshold value. For each of the plurality of measurement results, the measurement result is compared to a corresponding threshold of the plurality of thresholds in operation 802 and a determination is made as to whether the measurement result is above or below the corresponding threshold in accordance with the indication of the corresponding threshold in operation 804. In operation 806, responsive to the measurement result being above or below the threshold in accordance with the indication for all of the plurality of measurement results, a determination is made that the high-quality indication should be provided.

Returning to FIG. 7, in operation 706, responsive to determining that the high-quality indication should be provided, the high quality indication and an identification of the found PLMN is provided to the NAS. For example, responsive to the RSRP being greater than the RSRP threshold and the additional specified measurement results are above or below the thresholds as specified, the processing circuitry 203 may forward the identification of the PLMN and the high-quality indication to the NAS.

Responsive to either the RSRP being less than the RSRP threshold or any of the additional specified measurement results are not above or below the thresholds as specified, the processing circuitry 203 may forward the identification of the PLMN and the measured RSRP and additional measurement value(s) to the NAS in operation 708.

In one embodiment the existing RSRP based "high quality signal" decision is complemented by a second NTN specific "high quality signal" decision that is based on the measured values for one or more of the above metrics.

A combined determination of a "high quality signal" is based on both metrics, and the signaling of the measured metrics is based on the metrics and the measured values as exemplified in the below figure. If the NTN specific criteria is not met a high quality indication based on RSRP may still apply.

Figure 9:
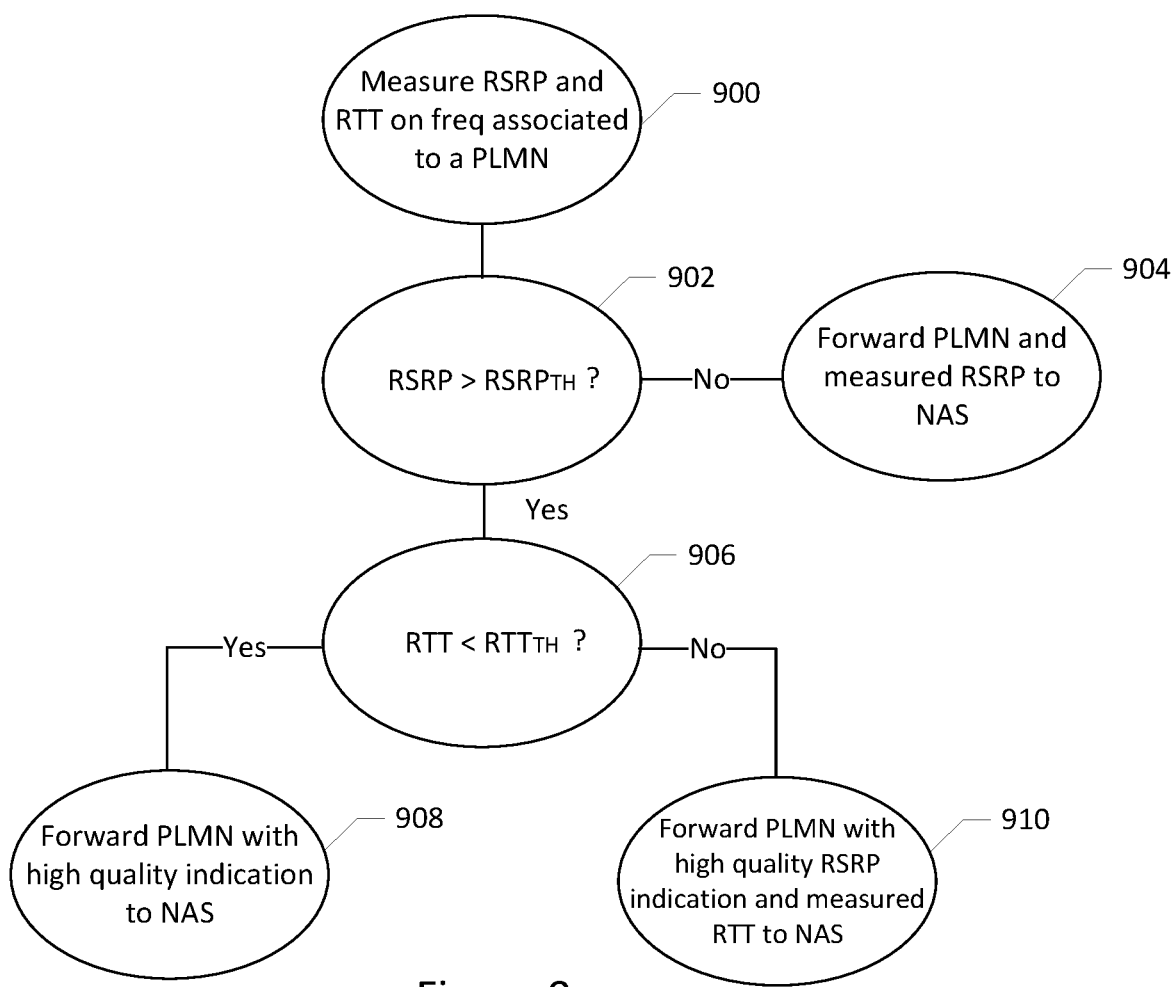

FIG. 9 illustrates aspects of this embodiment. Turning to FIG. 9, the additional measurement result specified is RTT. In operation 900, the processing circuitry 203 may measure the RSRP and RTT on the frequency associated to a PLMN. In operation 902, the processing circuitry 203 may determine whether the RSRP is greater than the specified RSRP threshold. Responsive to the RSRP not being greater than the RSRP threshold, the processing circuitry 203 may forward the identification of the PLMN and the measured RSRP to the NAS in operation 904.

Responsive to the RSRP being greater than the RSRP threshold, the processing circuitry 203 may determine whether the RTT is less than the RTT threshold in operation 906.

Responsive to the RTT being less than the RTT threshold, the processing circuitry 203 may forward the identification of the PLMN and a high-quality indication to the NAS in operation 908. Responsive to the RTT not being less than the RTT threshold, the processing circuitry 203 may forward the identification of the PLMN and a high-quality RSRP indication to the NAS and the measured RTT value to the NAS in operation 910.

Figure 10:
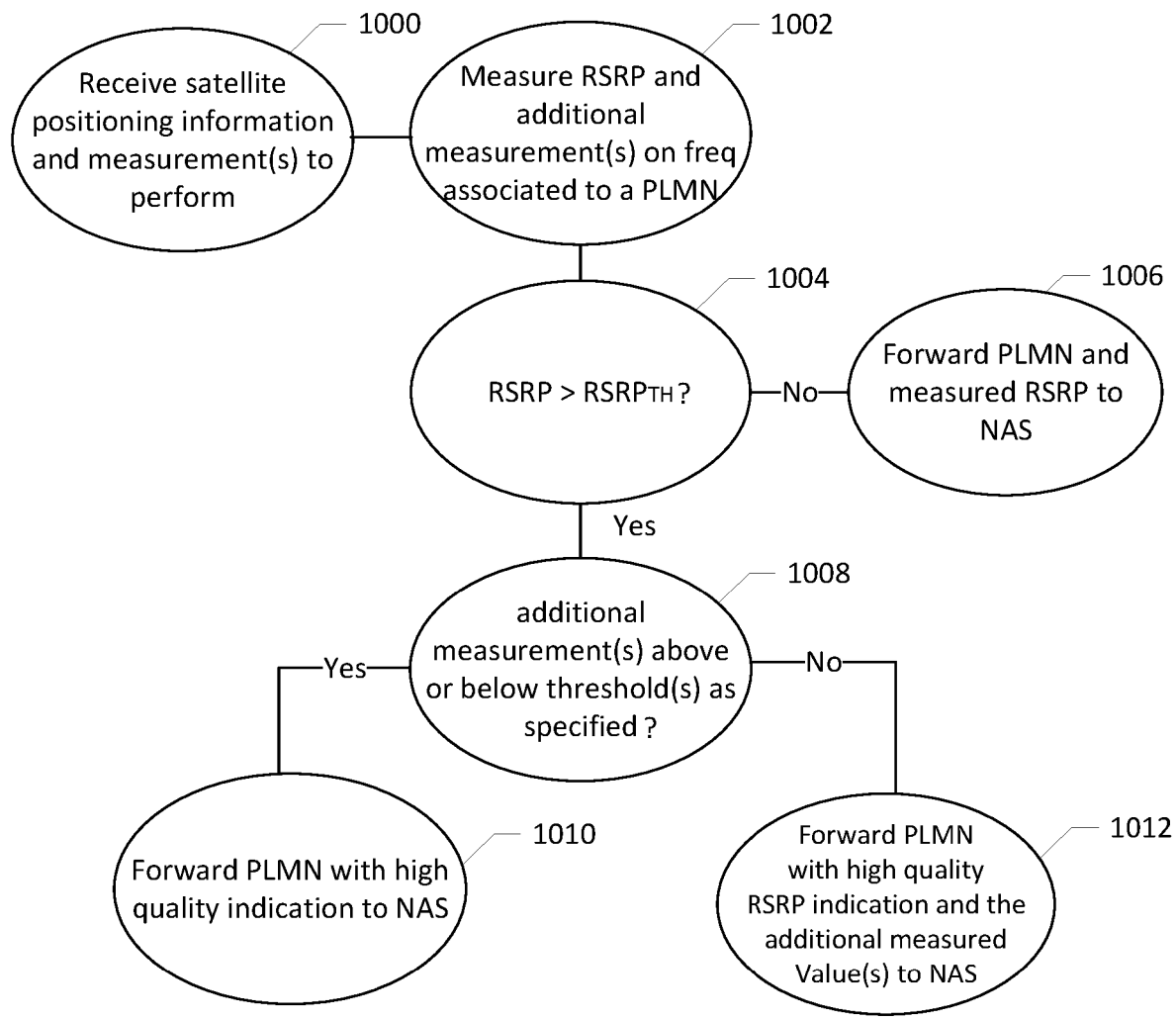

FIG. 10 illustrates an embodiment where multiple additional measurements may be taken. In operation 1000, the processing circuitry 203 may receive satellite positioning information and/or a list of a plurality of measurements to perform to find a PLMN to select. The plurality of measurements may include a plurality of different types of measurements. In some embodiments, one of the plurality of different types of measurements includes an RSRP measurement. IN additional or alternative embodiments, the list of the plurality of different types of measurements may include at least one of a reference signal received quality, RSRQ, measurement a signal-to-interference-plus-noise ratio, SINR, measurement a round trip time, RTT, measurement and a differential delay measurement. In some examples, a differential delay is a difference in propagation delay of UEs in the cell. In additional or alternative examples, a differential delay is the difference in distance between the UE and a satellite. The satellite positioning information may include at least one of a UE geographical position, a satellite elevation angle, a satellite orbital height, and satellite ephemeris data. The list may also provide the threshold to use in which to compare the measurement results for each of the plurality of different types of measurements. For example, the threshold for a measurement result may indicate whether the measurement result should be above or below the specified threshold value. The one or more measurements may depend on the capability of the UE as described above. When a specified measurement is satellite specific, a default comparison result may be specified for terrestrial based PLMNs. For example, if satellite elevation angle is specified and the threshold specified is being greater than or equal to a specified angle, the default comparison result for terrestrial based PLMNs is an indication of a "yes." Alternatively, the comparison result may indicate that it is not applicable.

In operation 1002, the processing circuitry 203 may perform the plurality of measurements on a frequency associated with a found PLMN. For example, a measurement of the RSRP and the additional specified measurements on the frequency associated with a found PLMN may be performed. In operation 1004, the processing circuitry 203 may determine whether the RSRP is greater than the specified RSRP threshold. Responsive to the RSRP not being greater than the RSRP threshold, the processing circuitry 203 may forward the identification of the PLMN and the measured RSRP to the NAS in operation 1006.

Responsive to the RSRP being greater than the RSRP threshold, the processing circuitry 203 may determine whether every additional measurement result in the plurality of measurement results is above or below the corresponding threshold as specified in operation 1008. For example, if the additional specified measurement results are RTT and RSRQ, the thresholds may be $RTT<RTT_{TH}$ and $RSRQ \geq RSRQ_{TH}$. Determining whether every additional measurement result in the plurality of measurement results is above or below the corresponding threshold as specified is determined when $RTT<RTT_{TH}$ and $RSRQ \geq RSRQ_{TH}$.

Figure 11:
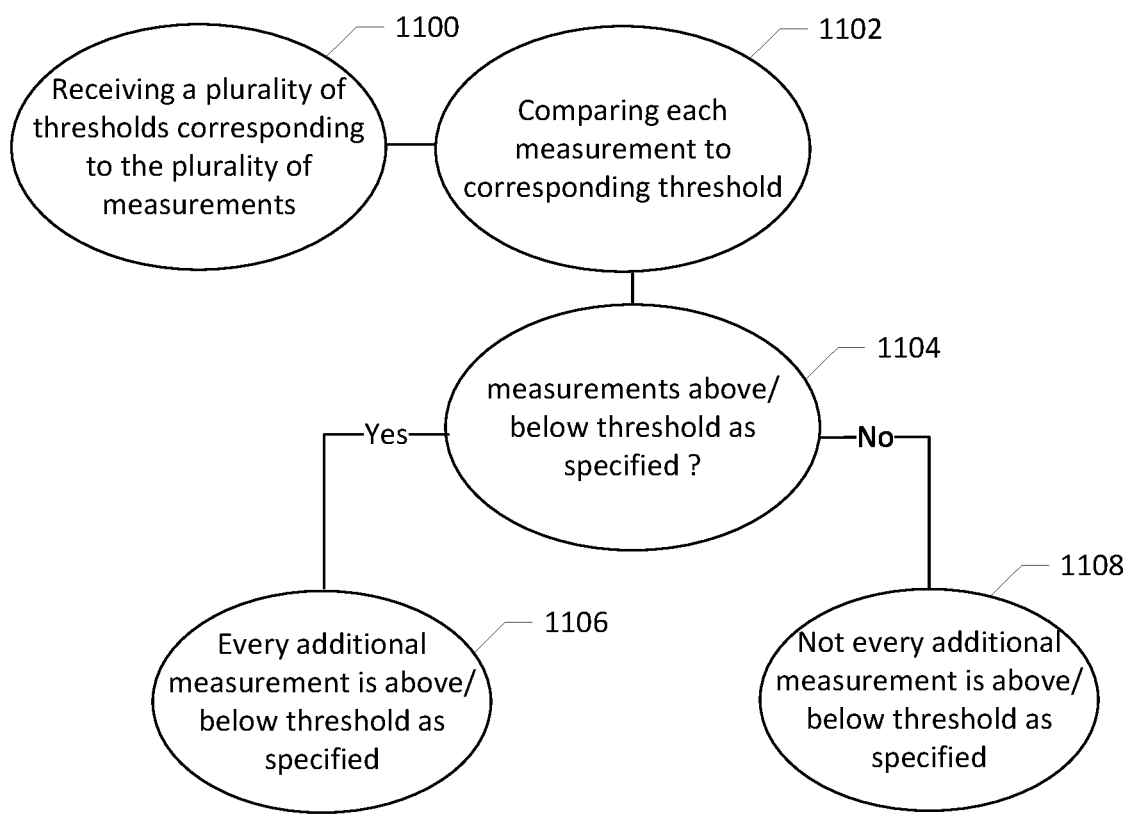

Turning to FIG. 11, in one embodiment, determine whether every additional measurement result in the plurality of measurement results is above or below the corresponding threshold as specified includes receiving, in operation 1100, a plurality of thresholds, each of the plurality of thresholds corresponding to one of the plurality of measurement results and indicating whether the measurement result should be above or below a threshold value. For each of the plurality of measurement results, the measurement result is compared to a corresponding threshold of the plurality of thresholds in operation 1102 and a determination is made as to whether the measurement result is above or below the corresponding threshold in accordance with the indication of the corresponding threshold in operation 1104. In operation 1106, responsive to the measurement result being above or below the threshold in accordance with the indication for all of the plurality of measurement results, a determination is made that every additional measurement in the plurality of measurement results is above or below the corresponding threshold as specified. In operation 1108, responsive to any measurement result not being above or below the threshold in accordance with the indication for the measurement, a determination is made that not every additional measurement result is above/below the threshold as specified.

Returning to FIG. 10, responsive to every of the additional specified measurement results being above or below the thresholds as specified, the processing circuitry 203 may forward the identification of the found PLMN and a high-quality indication to the NAS in operation 1010.

Responsive to any of the additional specified measurement results not being above or below the thresholds as specified, the processing circuitry 203 may forward the identification of the found PLMN with the high quality RSRP indication and the additional measurement results to the NAS in operation 1012. For example, if $RTT>RTT_{TH}$ or $RSRQ<RSRQ_{TH}$, then the RTT and the RSRQ are not above or below the thresholds as specified.

In one embodiment a UE may be required to receive the NTN PLMN system information to acquire NTN specific information specified in the NTN PLMN system information such as satellite ephemeris data, satellite orbit altitude, NTN type (e.g., LEO, MEO, GEO), constellation size (e.g., number of satellites in the constellation), maximum supported RTT, and/or number of tracking areas supported by the PLMN. The UE AS may pass this information to the NAS together with the PLMN ID.

In one embodiment the UE NAS logic may rank and prioritize selection of a PLMN that qualifies as a high quality PLMN based on the AS measurements and information conveyed to NAS as described above. The NAS may also use the signalled AS information for ranking the PLMNs in case no high quality PLMN is identified.

Figure 12:
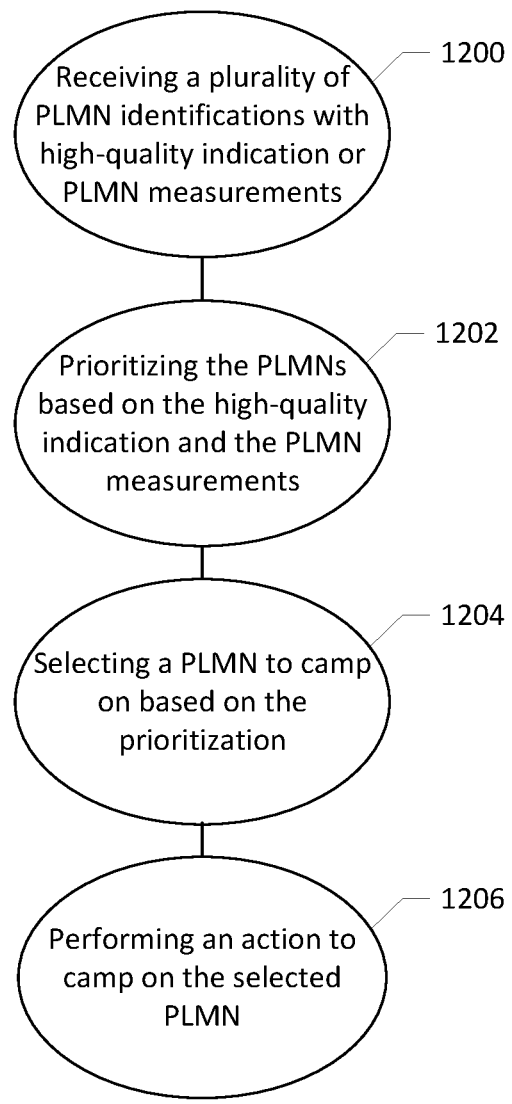
FIGS. 12-14 are flow charts illustrating operations to select a PLMN to camp on according to some embodiments of inventive concepts.

FIG. 12 illustrates an embodiment where the UE NAS logic may prioritize PLMNs and select a PLMN based on the prioritization. In operation 1200, the processing circuitry 203 may receive, from an access stratum layer, for each of a plurality of public land mobile networks, PLMNs, an identification of the PLMN and one of a plurality of measurements for the PLMN or a high-quality indication for the PLMN, the PLMN being one of a terrestrial PLMN or a non-terrestrial network, NTN, PLMN. The NTN PLMN may be a type of radio access technology (RAT) that is different from terrestrial PLMNs.

In operation 1202, the processing circuitry 203 may prioritize the plurality of PLMNs based on the high-quality indication and the plurality of measurements. For example, if there are high-quality indications, the PLMNs associated with the high-quality indications may be prioritized over the PLMNs that are not associated with a high-quality indication. The PLMNs that are not associated with a high-quality indication are prioritized based on the measurements.

Figure 13:
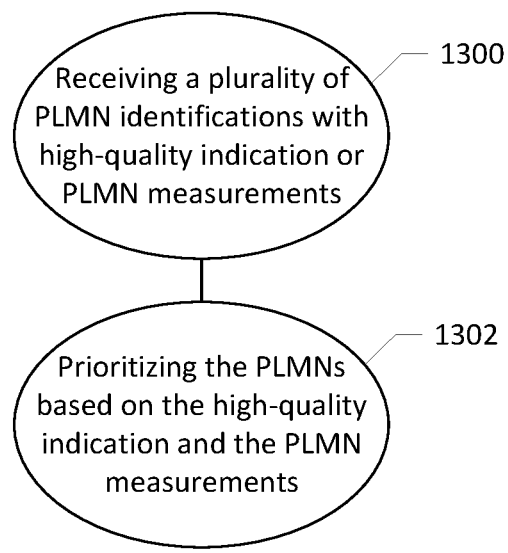

In another embodiment the PLMN selection may support a distinction between terrestrial and non-terrestrial networks. In one embodiment, the prioritizing may include prioritizing PLMNs based on PLMN type. Turning to FIG. 13, in one embodiment, the processing circuitry 203 may, in operation 1300, prioritize terrestrial PLMNs in the plurality of PLMNs to provide a terrestrial prioritization. In operation 1302, the processing circuitry 203 may prioritize the NTN PLMNs in the plurality of PLMNs in a NTN prioritization separate from the terrestrial prioritization.

Returning to FIG. 12, in operation 1204, the processing circuitry 203 may select a PLMN to camp on from the plurality of PLMNs based on the prioritization. For example, if there are PLMNs having a high-quality indication, one of these PLMNs may be selected before a PLMN not having a high-quality indication may be selected. If there are no high-quality indications, then the selection may be based on the prioritization of the measurements. In one embodiment, the prioritization of the measurements may prioritize one type of measurement over another type of measurement. For example, an RTT measurement may take priority over a differential delay measurement such that a PLMN is selected based on the PLMN having a lower RTT measurement than other PLMNs.

In one embodiment the PLMN selection may support a distinction between terrestrial and non-terrestrial networks. PLMN selection can then be based on this distinction and whether the UE supports one or the other. This is illustrated in FIG. 14.

Figure 14:
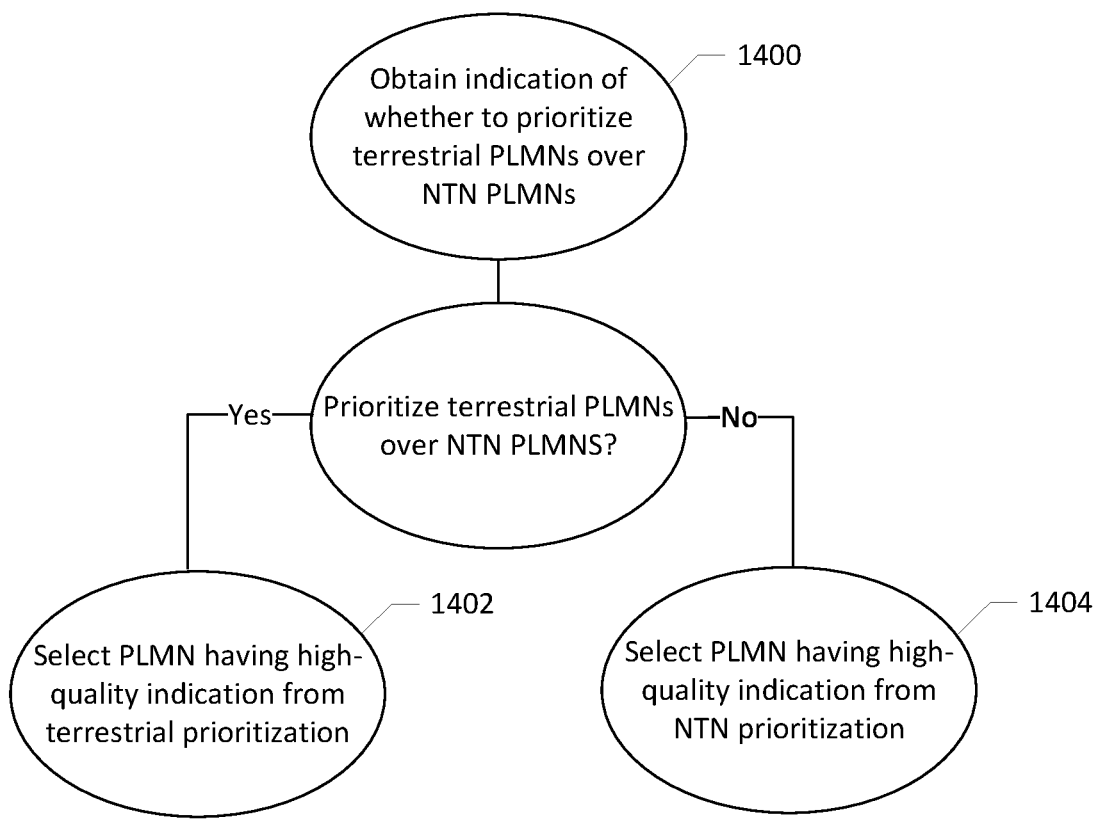

Turning to FIG. 14, in operation 1400, the processing circuitry 203 may obtain an indication of whether to prioritize the terrestrial PLMNs over the NTN PLMNs. In operation 1402, responsive to the indication indicating to prioritize the terrestrial PLMNs over the NTN PLMNs, the processing circuitry 203 selects a PLMN having a high-quality indication from the terrestrial prioritization. In operation 1404, responsive to the indication indicating to prioritize the NTN PLMNs over the terrestrial PLMNs, the processing circuitry 203 selects a PLMN having a high-quality indication from the NTN prioritization.

Returning to FIG. 12, in operation 1206, the processing circuitry 203 may perform an action to camp on the selected PLMN.

In a further embodiment, the PLMN selection may support a distinction between different types of non-terrestrial networks, such as LEO, MEO and GEO. The PLMN selection from the plurality of PLMNs can then be based on this distinction. For example, the NTN PLMNs in the plurality of PLMNs may be prioritized based on a type of the NTN PLMN, wherein the type of the NTN PLMN comprises one of a low earth orbit, LEO, NTN, a medium earth orbit, MEO, NTN, or a geostationary orbit, GEO, NTN. An indication of a priority of which of the LEO PLMN, the MEO PLMN, and the GEO PLMN to select before selecting other PLMNs of the LEO PLMN, the MEO PLMN, and the GEO PLMN may be obtained and the selection of the PLMN to camp on may be in accordance with the priority. For example, responsive to receiving an indication of a PLMN for each of the LEO PLMN type, the MEO PLMN type, and the GEO PLMN type having a high-quality indication, the PLMN may be selected to camp on in accordance with the priority. The different type can also be based on satellite constellation size, orbit altitude, and/or RTT.

In another embodiment an NTN PLMN may be identified as a separate type of PLMN, known as, for example, a "N-PLMN". The NTN PLMN applies to any existing type of PLMNs such as HPLMN ("N-HPLMN"). This new PLMN type may be used to refine the PLMN selection based on PLMN type.

In a further embodiment, the NTN may be identified as a separate access technology in 3GPP TS 23.122. Existing PLMN selection functionality based on access technology may then include NTN. Different types of NTNs, i.e. LEO, MEO, GEO, may be identified as separate access technologies to refine the PLMN selection based on access technology.

In another embodiment the PLMN selection may be based on the RTT.

In another embodiment the PLMN selection may be complemented with a set of requirements based on NTN characteristics such as orbit height, RTT or satellite ephemeris data. This information can be signalled from the AS as outlined above. One requirement may be that a UE with guaranteed bit rate, low latency requirements or high reliability requirements should ignore NTN PLMNs. In other words, the NTN PLMN is not prioritized. Another example is that UE with high requirements on battery life may deprioritize a PLMN with many tracking areas since this may be associated with heavy tracking area update signalling.

Explanations are provided below for various abbreviations/acronyms used in the present disclosure.

| Abbreviation | Explanation |
|---|---|
| AS | Access Stratum |
| BS | Base Station |
| BL/CE | Bandwidth Limited/Coverage Extended |
| DRB | Data Radio Bearer |
| GEO | Geostationary Orbit |
| GPS | Global Positioning System |
| GW | Gateway |
| LEO | Low Earth Orbit |
| MEO | Medium Earth Orbit |
| Msg1 | Message 1 |
| Msg2 | Message 2 |
| Msg3 | Message 3 |
| Msg4 | Message 4 |
| NAS | Non-Access Stratum |
| NGSO | Non-Geostationary Orbit |
| NW | Network |
| NTN | Non-terrestrial Network |
| RF | Radio Frequency |
| RLC | Radio Link Control |
| RTT | Round-Trip Time |
| RRC | Radio Resource Control |
| SINR | Signal to Interference Noise Ratio |
| TA | Timing Advance |
| TAU | Tracking Area Update |
| QoS | Quality of Service |

References are Identified Below.

[1] TR 38.811, Study on New Radio (NR) to support non-terrestrial networks

[2] RP-181370, Study on solutions evaluation for NR to support non-terrestrial Network Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless device (UE) in a communication network, the method comprising:
   receiving satellite positioning information;
   receiving a list of a plurality of different types of measurements to perform to find a public land mobile network (PLMN) to select;
   performing the plurality of different types of measurements on a frequency associated with a found PLMN to generate a plurality of measurement results;
   determining based on the plurality of measurements results whether a high-quality indication should be provided to a non-access stratum (NAS); and
   responsive to determining that the high-quality indication should be provided, the high quality indication and an identification of the found PLMN to the NAS.

2. The method of claim 1, wherein the list of the plurality of different types of measurements includes at least two of a reference signal received power (RSRP) measurement, a reference signal received quality (RSRQ) measurement, a signal-to-interference-plus-noise ratio (SINR) measurement, a round trip time (RTT) measurement, and a differential in propagation delay measurement.

3. The method of claim 1, wherein the satellite positioning information includes at least one of a UE geographical position, a satellite elevation angle, a satellite orbital height, and satellite ephemeris data.

4. The method of claim 1, wherein determining based on the plurality of measurements results whether the high-quality indication should be provided to the NAS comprises:
   receiving a plurality of thresholds, each of the plurality of thresholds corresponding to one of the plurality of measurements results and indicating whether the each of the plurality of measurement results should be above or below a threshold value;
   for each measurement of the plurality of measurements:
      comparing the measurement to a corresponding threshold of the plurality of thresholds; and
      determining whether the measurement is above or below the corresponding threshold in accordance with the indication of the corresponding threshold; and
   responsive to the measurement being above or below the threshold in accordance with the indication for all of the plurality of measurements, determining that the high-quality indication should be provided.

5. The method of claim 1, further comprising:
   responsive to determining that the high-quality indication should not be provided, providing the identification of the found PLMN and the plurality of measurements results to the NAS.

6. The method of claim 1, further comprising:
   receiving non-terrestrial network, NTN, PLMN system information;
   providing NTN specific information from the NTN PLMN system information to the NAS.

7. The method of claim 6, wherein providing NTN specific information from the NTN PLMN system information to the NAS comprises providing satellite ephemeris data, satellite orbit altitude, NTN type, constellation size, maximum supported RTT, and/or a number of tracking areas supported by the PLMN.

8. The method of claim 1, further comprising:
   determining whether the found PLMN is a NTN PLMN;
   responsive to the found PLMN being a NTN PLMN and the wireless device having a guaranteed bit rate, low latency or a specified reliability requirement, not selecting the found PLMN.

9. A wireless device configured to operate in a communication network, the wireless device comprising:
   processing circuitry; and
   memory coupled with the processing circuitry, wherein the memory includes instructions that when executed by the processing circuitry causes the wireless device to perform operations according to claim 1.

10. A method of operating a wireless device in a communication network, the method comprising:
    receiving satellite positioning information;
    receiving a list of a plurality of different types of measurements to perform to find a public land mobile network (PLMN) to select, the plurality of measurements including a reference signal received power (RSRP) measurement;
    performing the plurality of different types of measurements on a frequency associated with a found PLMN to generate a plurality of measurement results including a RSRP;
    determining whether the RSRP measurement result is greater than a RSRP threshold;
    responsive to determining the RSRP measurement result is greater than the RSRP threshold:
       determining based on the plurality of measurement results whether every additional measurement result in the plurality of measurement results is above or below the corresponding threshold as specified;
       responsive to every of the additional specified measurement results being above or below the thresholds as specified, forwarding the identification of the found PLMN and a high-quality indication to the NAS; and
       responsive to any of the additional specified measurement results not being above or below the thresholds as specified, forwarding the identification of the found PLMN with a high quality RSRP indication and the additional measurement results to the NAS.

11. The method of claim 10, wherein the list of the plurality of different types of measurements includes at least one of a reference signal received quality (RSRQ) measurement, a signal-to-interference-plus-noise ratio (SINR) measurement, a round trip time, RTT, (RTT) measurement, and a differential delay measurement.

12. The method of claim 10, wherein the satellite positioning information includes at least one of a UE geographical position, a satellite elevation angle, a satellite orbital height, and satellite ephemeris data.

13. The method of claim 10, wherein determining based on the plurality of measurement results whether every additional measurement result in the plurality of measurement results is above or below the corresponding threshold as specified comprises:

receiving a plurality of thresholds, each of the plurality of thresholds corresponding to one of the plurality of measurement results and indicating whether the measurement result should be above or below a threshold value;

for each of the plurality of measurements:
comparing the measurement result to a corresponding threshold of the plurality of thresholds; and
determining whether the measurement result is above or below the corresponding threshold in accordance with the indication of the corresponding threshold; and responsive to the measurement result being above or below the threshold in accordance with the indication for all of the plurality of measurement results, determining that every additional measurement result in the plurality of measurement results is above or below the corresponding threshold as specified.

14. The method of claim 10, further comprising:
responsive to determining that the RSRP measurement result is less than the RSRP threshold, providing the identification of the found PLMN and the RSRP measurement result to the NAS.

15. The method of claim 10, further comprising:
receiving non-terrestrial network (NTN) PLMN system information;
providing NTN specific information from the NTN PLMN system information to the NAS.

16. The method of claim 15, wherein providing NTN specific information from the NTN PLMN system information to the NAS comprises providing satellite ephemeris data, satellite orbit altitude, NTN type, constellation size, maximum supported RTT, and/or a number of tracking areas supported by the PLMN.

17. The method of claim 10, further comprising:
determining whether the found PLMN is a NTN PLMN;
responsive to the found PLMN being a NTN PLMN and the wireless device having a guaranteed bit rate, low latency or a specified reliability requirement, not selecting the found PLMN.

18. A method of operating a wireless device in a communication network, the method comprising:
receiving for each of a plurality of public land mobile networks (PLMNs) an identification of the PLMN and one of a plurality of measurement results for the PLMN or a high-quality indication for the PLMN, the PLMN being one of a terrestrial PLMN or a non-terrestrial network (NTN) PLMN;
prioritizing the plurality of PLMNs based on the high-quality indication and the plurality of measurements;
selecting a PLMN to camp on from the plurality of PLMNs based on the prioritization; and
performing an action to camp on the selected PLMN.

19. The method of claim 18, wherein the NTN PLMN comprises a radio access technology (RAT) different from the terrestrial PLMN RAT.

20. The method of claim 18, wherein prioritizing the plurality of PLMNs based on the high-quality indication and the plurality of measurement results comprises:
Prioritizing the terrestrial PLMNs in the plurality of PLMNs to provide a terrestrial prioritization; and
prioritizing the NTN PLMNs in the plurality of PLMNs in a NTN prioritization separate from the terrestrial prioritization; and
wherein selecting a PLMN to connect to from the plurality of PLMNs comprises:
obtaining an indication of whether to prioritize the terrestrial PLMNs over the NTN PLMNs;
responsive to the indication indicating to prioritize the terrestrial PLMNs over the NTN PLMNs, selecting a PLMN having a high-quality indication from the terrestrial prioritization; and
responsive to the indication indicating to prioritize the NTN PLMNs over the terrestrial PLMNs, selecting a PLMN having a high-quality indication from the NTN prioritization.

\* \* \* \* \*